Feb. 21, 1956     F. W. MERRILL     2,735,952
DYNAMOELECTRIC MACHINE MAGNETIC CORE MEMBER
Filed Jan. 4, 1954     2 Sheets-Sheet 2
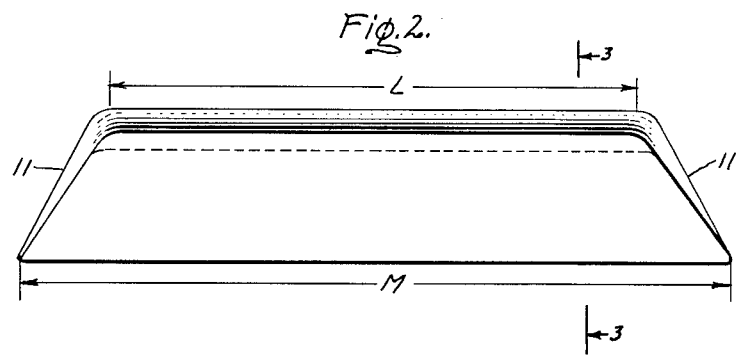
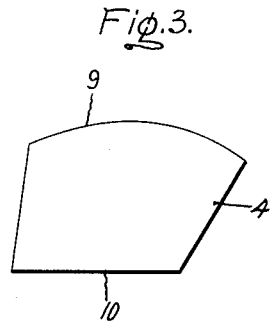
Inventor:
Frank W. Merrill,
by *Robert G. Arig*
His Attorney.

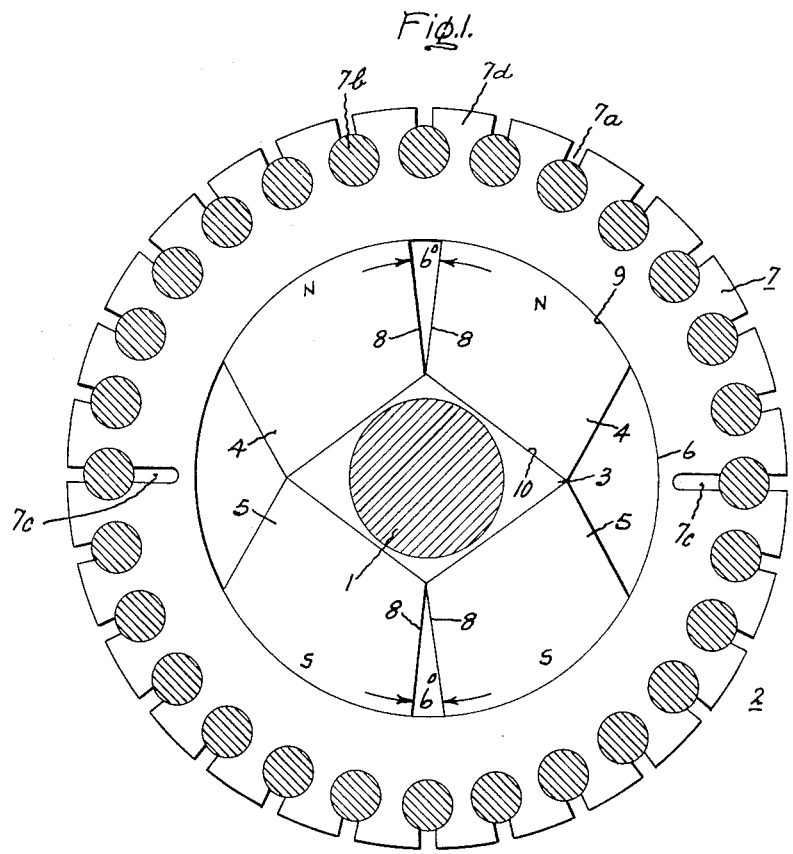

United States Patent Office 2,735,952
Patented Feb. 21, 1956

2,735,952

DYNAMOELECTRIC MACHINE MAGNETIC CORE MEMBER

Frank W. Merrill, Fort Wayne, Ind., assignor to General Electric Company, a corporation of New York Application January 4, 1954, Serial No. 401,907

9 Claims. (Cl. 310—156)

This invention relates to rotors for dynamoelectric machines, and more particularly to an improvement in rotors for synchronous motors and generators having permanent magnet excitation.

In the past, synchronous machines have frequently been provided with rotors having a permanent magnet polarized radially to form polar areas on the outer surface thereof, and with a laminated ring member surrounding the permanent magnet and having a plurality of slots in the outer surface thereof. Squirrel cage bars, short circuited by end rings, are generally positioned in the slots, and interpolar slots which extend inward substantially through the laminated ring may be provided. Such an arrangement is disclosed in complete detail in Patent 2,525,455 issued to the present applicant and assigned to the assignee of the present application. In electric motors incorporating this type of rotor the squirrel cage winding in the laminated ring causes the motor to start as an induction motor and, when the motor has come up to speed, the permanent magnet flux locks in with the stator flux so that the motor runs as a synchronous motor. The structure described may be varied, insofar as multipolar rotors are concerned, to increase resistance to demagnetization by forming each permanent magnet pole of a separate block individually secured to a noncircular shaft. This structure is more fully set forth in Patent 2,643,350, also issued to the present applicant and assigned to the assignee of the present application. However, such a structure is not applicable to two-pole rotors, which, therefore, present an as yet unsolved problem.

Where two-pole motors have been built with the type of rotor described above, the rotor has generally had a single integral magnet pressed over the motor shaft. Motors so constructed have been characterized by an output rather lower than might have been expected from the magnet volume, when compared to the output of multipolar rotors having a similar type of permanent magnet. While various means have been used to try to overcome this deficiency, such means as have hitherto been discovered have either proved unduly expensive to manufacture or else have not improved the output to the extent that might have been expected.

The principal reason for this decrease in output per unit weight of magnet, as described in general terms above, has been found to be the round steel shaft generally present in this type of motor; with previous constructions the shaft has been directly in line with the internal flux path of the magnet causing localized magnetic shortcircuits in the body of the magnet thereby decreasing its output. Another important reason for the decrease in output has been the inequality of the length of the flux path in the permanent magnet due to the presence of the shaft, whether it be of magnetic or non-magnetic material, and the shape of the magnet. This results in an aggravation of the shortcircuiting condition. I propose, by the improvement described herebelow, to remove to a substantial extent both of the abovementioned causes for lowered output while retaining the necessary and desirable economy in the manufacturing process.

An object of this improvement, therefore, is to increase the output of two pole synchronous motors, utilizing permanet magnet rotors, without unduly increasing the cost of manufacture.

Another object of this invention is to provide a two-pole permanent magnet excited rotor which will permit the motor in which it is used to have an output commensurate with the magnet volume.

Still another object of this invention is to improve the shape of permanent magnet to avoid the localized magnetic shortcircuits in the magnet which decrease the output of the motor.

Another object of this invention is to correct the short-circuiting condition caused by the presence of the rotor shaft in parallel with part of the magnet flux.

Further objects and advantages of this invention will become apparent and the invention will be better understood by reference to the following description and the accompanying drawings, and the features of novelty which characterize this invention will be pointed out with particularity in the claims annexed to and forming a part of this specification.

This invention is its broadest aspects provides a rotor for a synchronous motor having a shaft, a two pole permanent magnet rotor secured to the shaft, and a laminated ring surrounding the magnet and having a squirrel cage winding arranged therein. Each of the poles of the permanent magnet rotor comprises two separate and adjacent permanent magnet blocks. More specifically, the shaft has a noncircular cross-section, preferably rhomboidal, with each of the magnet blocks having a curved outer surface engaging the inner surface of the laminated ring and a flat inner surface engaging a side of the rhombic shaft section. The magnets are preferably magnetized in place after assembly in the rotor with a flux having the proper direction for a two-pole field, that is, along the rotor diameter passing through the short diagonal of the non circular center. Thus, the two blocks constituting a single pole have the same polarity adjacent the laminated ring while the two blocks constituting the other pole have the opposite polarity adjacent the laminated ring.

In the drawing, Figure 1 is an end view, cross-sectional in part, of the improved rotor of this invention;

Figure 2 is a side view of a magnet block of the improved rotor; and

Figure 3 is a view along line 3—3 of Figure 2.

Referring now to the figures of the drawing, there is shown in cross-section a motor shaft 1. Within the rotor itself, generally indicated at 2, shaft 1 has a polygonal cross-section, preferably rhombic, as shown at 3. The use of such a shape permits each of the two magnet blocks 4 and the two magnet blocks 5 to have an approximately constant magnet flux strength. It is preferable to use two blocks for each pole of the magnet because of the comparatively large steel center that the rhombic shape 3 involves.

The assembly of rhombic shaft 3 and of magnet blocks 4 and 5 is secured within a laminated rotor ring 7. This may be done in any desired manner; however, press-fitting or shrink fitting the permanent magnet and shaft assembly into the laminated ring 7 are preferred methods.

Around the perimeter of laminated ring 7 are a plurality of slots 7a. The slots are preferably equidistant and relatively close together to secure a high flux density in teeth 7d between bars 7b. Bars 7b are all connected together at each end of motor ring 7 by end rings (not shown). Bars 7b and the end rings provide a squirrel cage winding so that a motor in which rotor 2 is used may be started as an induction motor. The high number of bars 7b placed relatively close together secure a dense flux between the bars; this is a highly desirable feature since large flux surges entering the permanent magnet, which might well demagnetize it to a large extent, are sharply checked by these dense flux areas between the bars.

Rotor ring 7 is also provided with a pair of deep slots 7c. Each of these slots is intermediate the north and south poles of the magnet and is as deep as is feasible without endangering the mechanical strength of rotor ring 7. As is more fully described in Patent 2,525,455 to the present applicant, these slots permit channeling of a large amount of the permanent magnet flux to the stator (not shown) when the motor is operating synchronously and help to prevent shortcircuiting of the permanent magnet flux by the laminated ring 7.

The basis for the rhombic shape of shaft 3 will now be explained. As discussed above, a round rotor shaft causes internal shortcircuiting in the magnet and also causes the effective flux length through the magnet to vary considerably, thereby aggravating the condition. In order to have the flux length through the magnet poles be perfectly constant throughout, the shaft should have a cross-sectional shape made up of two intersecting arcs. Each arc would have the same radius as the internal surface of rotor ring 7 and would be drawn from a center point located on a vertical axis through the cross-section of rotor 2. By using a permanent magnet of the same width as the distance from one intersection of such arcs to the other intersection thereof, the magnetic flux lines through each pole of such a magnet would travel in a vertical direction; because of this, the distance from any point of a magnet pole in contact with the rotor ring directly down to the arc shaped shaft would be exactly the same as a like measurement taken from any other point on the outer surface of the pole. While such a construction would avoid both main reasons for lowered motor output, it has the disadvantage that a shaft of such a cross-section would be highly expensive to manufacture.

Rhombic shaft 3 presents an excellent compromise between the ideal arc shaped shaft and manufacturing reality. It approximates the ideal shaft, and it may be simply manufactured by machining the side of a square steel rod to reduce its vertical axis, or, in large quantity production, shaft stock may be produced directly in the rhombic shape by the use of appropriate drawing dies or rolls. The effective flux length through the permanent magnet, while not perfectly constant throughout, is kept substantially constant by the shape of shaft 3, far more so than if circular shaft 1 extended through the rotor as is generally true. In such a case the effective flux length through the magnet would vary by as much as 44 per cent while the present simple construction keeps the difference well within 15 per cent.

The separate blocks 4 of one pole and 5 of the other pole are preferably so formed that when they are mounted on the rhombic shaped center 3, the two blocks of each pole are at an angle of approximately 6° to each other. This leaves sufficient space between the blocks of each pole so that adequate clearance is provided without machining the sides 8 of the blocks.

To obtain optimum performance, it is desirable that a constant cross-section be maintained throughout the magnetic length of the individual blocks so that loss of excitation from too high a magnet density in the restricted areas will be prevented. This means that the magnet area of each magnet block at the area of contact with the laminated rotor ring 7 should approximately equal the magnet area of the block at the area of contact with shaft 3. It will be obvious, from an inspection of Figure 3, that the length of outside edge 9 of a block, such as 4 for instance, far exceeds the length of inner edge 10 which is in contact with the shaft 3. Since the magnet area of the outer part of the block will be the product of outer edge 9 times the length L (Figure 2) of block 4 with which ring 7 is in contact, and the area of the inner part of the block will be the product of inner edge 10 times the length M (Figure 2) of block 4 with which shaft 3 is in contact, it is clear that M must exceed L for the two areas to be equal. For this reason the blocks are given the general shape shown in Figure 2 in preference to cutting them off square on the ends. The sloping ends 11 are given an angle such as to ensure an approximately constant area at any point from the inner surface to the outer surface of the block. The extension of length M along shaft 3 will have ample clearance when fitted into a finished motor (not shown) because of the clearance which is already necessary for the thickness if the rotor end rings. The principles involved in the construction of Figures 2 and 3 to ensure area equalization are the same as those set forth in Patent 2,643,350, mentioned above.

It is clear from the above description that my improvement achieves a two-pole permanent magnet rotor for synchronous motors which is simple and inexpensive to manufacture, yet which approaches very closely the requisite specifications for best motor performance.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. In a permanent magnet rotor for synchronous motor, the improvement comprising a rotor shaft having a rhombic cross-section, four magnet blocks having inner surfaces respectively secured to said shaft, said the two blocks of each pair being respectively arranged blocks being arranged in two pairs, each pair being comprised of two adjacent blocks having the same polarity, on the shaft surfaces forming an obtuse angle of the rhombus, and a laminated rotor ring surrounding said blocks and having an inner surface secured to and abutting the outer surface of each of said blocks.

2. In a permanent magnet rotor for a synchronous motor, the improvement comprising a shaft having a rhombic cross-section, four magnet blocks having inner surfaces respectively secured to the surfaces of said shaft, said blocks being arranged in two pairs, each pair being comprised of two adjacent blocks having the same polarity, the two blocks of each pair being arranged respectively on the shaft surfaces forming an obtuse angle of the rhombus, and an outer laminated rotor ring surrounding said blocks and having a squirrel cage winding arranged therein, each of said blocks having an outer surface abutting the inner surface of said ring.

3. In a two-pole permanent magnet rotor for a synchronous motor, the improvement comprising a centrally located rotor shaft having a rhomboidal cross-section, four magnet blocks secured around said shaft, said blocks being arranged in two pairs, each pair being comprised of two adjacent blocks having the same polarity, and an outer laminated rotor ring positioned around said blocks and having a squirrel cage winding arranged therein, each of said blocks having an outer surface abutting the inner surface of said ring and having an inner surface abutting a surface of said shaft, the inner and outer surfaces of each of said blocks being formed substantially equal in area.

4. A rotor for a synchronous motor comprising a centrally located shaft having a rhomboidal cross-section, a two-pole permanent magnet structure mounted on said shaft, each of said poles comprising two separate and adjacent blocks, each of said blocks having a curved outer surface and further having a flat inner surface secured to a face of said shaft, and an outer laminated rotor ring positioned around said magnet structure and having a squirrel cage winding arranged therein, said curved outer surfaces of said blocks closely abutting the inner surface of said rotor ring, said inner and outer surfaces being formed substantially equal in area.

5. A rotor for a synchronous motor comprising a shaft having a rhombic cross-section, a two-pole permanent magnet structure mounted on said shaft, and a laminated rotor ring positioned around said magnet structure and rotor ring having a smooth inner surface, each pole of having a squirrel cage winding arranged therein, said said magnet structure comprising two separate magnet blocks, said blocks each having a curved outer surface with the same radius as and substantially entirely abutting the inner surface of said ring, each block further having a flat surface oppositely disposed from said curved surface and having side surfaces joining said curved surface and said oppositely disposed flat surface, each pair of said blocks which form a single pole abutting each other along a line formed by an edge of said oppositely disposed surface and so positioned that the side surfaces of said blocks which face each other form an angle of approximately 6° having the abutting line as an apex, each of the four faces of said shaft abutting and coincident with the oppositely disposed surface of one of said blocks, the two blocks of a single pole secured to the two faces of said shaft which form an obtuse angle of the rhombus and the two blocks of the other pole secured to the two faces forming the other obtuse angle of the rhombus, said blocks and said shaft forming together an assembly, said assembly being press-fitted into said ring.

6. A rotor for a synchronous motor comprising a shaft having a rhombic cross-section, a two-pole permanent magnet structure mounted on said shaft, and a laminated rotor ring positioned around said magnet structure and having a squirrel cage winding arranged therein, said rotor ring having a smooth inner surface, each pole of said magnet structure comprising two separate magnet blocks, said blocks each having a curved outer surface with the same radius as and substantially entirely abutting the inner surface of said ring, each block further having a flat surface oppositely disposed from said curved surface and having side surfaces joining said curved surface and said oppositely disposed flat surface, each pair of said blocks which form a single pole abutting each other along a line formed by an edge of said oppositely disposed surface and so positioned that the side surfaces of said blocks which face each other form an angle of approximately 6° having the abutting line as an apex, each of the four faces of said shaft abutting and coincident with the oppositely disposed surface of one of said blocks, the two blocks of a single pole secured to the two faces of said shaft which form an obtuse angle of the rhombus and the two blocks of the other pole secured to the two faces forming the other obtuse angle of the rhombus, said blocks and said shaft forming together an assembly, said assembly being press-fitted into said ring, each of said blocks having its ends slopingly cut so as to increase the length of said blocks as the oppositely disposed surface is approached.

7. A rotor for a synchronous motor comprising a shaft having a rhombic cross-section, a two-pole permanent magnet structure mounted on said shaft, and a laminated rotor ring positioned around said magnet structure and having a squirrel cage winding arranged therein, said rotor ring having a smooth inner surface, each pole of said magnet structure comprising two separate magnet blocks, said blocks each having a curved outer surface with the same radius as and substantially entirely abutting the inner surface of said ring, each block further having a flat surface oppositely disposed from said curved surface and having side surfaces joining said curved surface and said oppositely disposed flat surface, each pair of said blocks which form a single pole abutting each other along a line formed by an edge of said oppositely disposed surface and so positioned that the side surfaces of said blocks which face each other form an angle of approximately 6° having the abutting line as an apex, each of the four faces of said shaft abutting and coincident with the oppositely disposed surface of one of said blocks, the two blocks of a single pole being secured to the two faces of said shaft which form an obtuse angle of the rhombus and the two blocks of the other pole being secured to the two faces forming the other obtuse angle of the rhombus, said blocks and said shaft forming together an assembly, said assembly being press-fitted into said ring, each of said blocks having its ends cut at a slope such as to cause the area of said curved surface and the area of said oppositely disposed surface to be substantially equal.

8. A rotor for a synchronous motor comprising a centrally located shaft having a rhomboidal cross-section, a two-pole permanent magnet structure mounted on said shaft, each of said poles comprising two separate and adjacent blocks, each of said blocks having a curved outer surface and further having a flat inner surface secured to a face of said shaft, and an outer laminated rotor ring positioned around said magnet structure and having a squirrel cage winding arranged therein, said curved outer surfaces of said blocks closely abutting the inner surface of said rotor ring, each of said blocks having its ends cut at a slope such as to cause the area of said curved outer surface and the area of said oppositely disposed surface to be substantially equal.

9. A rotor for a synchronous motor comprising a shaft having a rhombic cross-section, a two-pole permanent magnet structure mounted on said shaft, and a laminated rotor ring positioned around said magnet structure and having a squirrel cage winding arranged therein, said rotor ring having a smooth inner surface, each pole of said magnet structure comprising two separate magnet blocks, said blocks each having a curved outer surface arranged substantially abutting the inner surface of said ring, each block further having a flat surface oppositely disposed from said curved surface and having side surfaces joining said curved surface and said oppositely disposed flat surface, each of the four faces of said shaft abutting and coextensive with said oppositely disposed flat surface of one of said blocks, the two blocks of a single pole being secured to the two faces of said shaft which form an obtuse angle of the rhombus and the two blocks of the other pole being secured to the two faces forming the other obtuse angle of the rhombus, said blocks and said shaft being securely engaged within said ring.

References Cited in the file of this patent

UNITED STATES PATENTS

| | | |
|---|---|---|
| 2,193,675 | Merrill | Mar. 12, 1940 |
| 2,418,980 | Morrill | Apr. 15, 1947 |
| 2,485,474 | Brainard | Oct. 18, 1949 |
| 2,493,102 | Brainard | Jan. 3, 1950 |
| 2,525,455 | Merrill | Oct. 10, 1950 |
| 2,525,456 | Merrill | Oct. 10, 1950 |